United States Patent [19]

[11] 3,796,848

Southworth, Jr.

[45] Mar. 12, 1974

[54] PIN CONNECTOR SWITCH

[75] Inventor: Hamilton Southworth, Jr., New York, N.Y.

[73] Assignee: Bell Telephone Laboratories, Incorporated, Murray Hill, N.J.

[22] Filed: Oct. 6, 1972

[21] Appl. No.: 295,469

[52] U.S. Cl......... 200/175, 317/101 CE, 340/166 R, 339/18 C, 317/112

[51] Int. Cl. .......................................... H01h 13/33

[58] Field of Search........... 339/17 LC, 18 B, 18 C; 317/101 CC, 101 CE, 118, 112; 335/112; 200/175; 340/166 R

[56] References Cited

UNITED STATES PATENTS

| | | | |
|---|---|---|---|
| 3,691,429 | 9/1972 | Glaser | 339/17 C |
| 3,701,964 | 10/1972 | Cronin | 339/18 C |
| 3,644,792 | 2/1972 | Fields | 317/101 CC |
| 3,551,631 | 12/1970 | Vazquez | 200/175 |
| 3,358,269 | 12/1967 | Benes | 200/175 |

*Primary Examiner*—Herman J. Hohauser
*Assistant Examiner*—Gerald P. Tolin
*Attorney, Agent, or Firm*—A. D. Hooper

[57] ABSTRACT

A distribution board or pin connector switch for a main distributing frame utilizes a printed circuit pin board with a special pin arrangement to obtain the advantages of a pin crosspoint switch simultaneous with a substantial reduction in the number of pins required in comparison with such a crosspoint switch. Input conductors are connected to pins in alternate rows with each group of four consecutive input conductors being connected to a plurality of groups of pins within one of the rows depending upon the total number of crosspoints. The output conductors are divided into two groups with the conductors of these groups being consecutively connected to the pins in the two rows on each side of the rows of input pins. This produces in essence a symmetrical pin arrangement wherein an input pin is shared by eight output pins and conversely. Thus the total number of pins required by the board is reduced by a factor of approximately eight as compared with a pin crosspoint switch. Connections between any input and output conductor can be effected by automated apparatus utilizing a small rigid connector to connect the appropriate input and output pins.

13 Claims, 7 Drawing Figures

PIN CONNECTOR SWITCH

BACKGROUND OF THE INVENTION

1. Field of the Invention

This invention relates to distribution boards or pin connector switches and more particularly to a distribution board for use in making cross connections in apparatus such as main distributing frames.

2. Description of the Prior Art

The need to provide flexibility of connections between outside cable plant and wire center equipment in telephone offices was recognized with the advent of the telephone central office. Thus, a main distributing frame evolved, as disclosed in U. S. Pat. No. 816,847 issued Apr. 3, 1906 to F. B. Cook, which provided termination for outside plant cable pairs on a fixed basis to a terminal strip on one side of the main distributing frame with similar terminations for inside plant conductors on the other side of the frame. Through the intervening years from the advent of the archetypical main distributing frame, substantial improvements in the technology of automatic switching systems have occurred, but the basic main distributing frame has remained the same.

Basically, a main distributing frame provides a means whereby outside plant cable may be cross-connected to a selected central office circuit by placing a cross-connection wire pair between the appropriate terminal strip appearances on either side of the main distributing frame. The terminal strip terminals also provide a convenient point for maintenance test access.

While the main frame functions satisfactorily so long as there is capacity for the addition of new connections, there is also a continuing need to change and rearrange existing cross-connections. In many cases existing main distributing frames have become completely filled with cross-connection wire pairs making it almost impossible to remove an obsolete cross-connection before placing a new cross-connection. Thus some main distributing frames have become so congested with active and dead cross-connection wire pairs that new cross-connections cannot be made, and the particular main distributing frames have had to be abandoned and replaced by new main distributing frames. The installation of new frames requires massive replacement and retermination of cables from outside plant and central office circuits along with replacement of the necessary cross-connections.

The present main distributing frame is in essence a large terminal switch. Such terminal switches have low initial costs as compared with crosspoint or matrix switches but are difficult to automate because of the overlapping cross-connections. On the other hand, presently known crosspoint or matrix switches which might be used in a main distributing frame can be automated but are too expensive for normal application. Thus, a need exists for new concepts in providing the cross-connections in main distributing frames in telephone central offices and like apparatus.

Accordingly, it is an object of this invention to improve the distribution boards or pin connector switches used in main distributing frames and like apparatus to provide greater flexibility in placing and removing cross-connections therein.

Another object is to provide a new distribution board or pin connector switch for use in main distributing frame and like apparatus on which cross-connections can be made automatically.

Another object is to provide a new distribution board for use in an automated main distributing frame and like apparatus having relatively low initial cost.

SUMMARY OF THE INVENTION

The foregoing objects and other are achieved in accordance with my invention by the utilization in a main distributing frame of a plurality of distribution boards or pin connector switches on which cross-connections are made. Each distribution board comprises a double sided printed wiring board having a plurality of input and output conductors thereon and a plurality of rows of connector pins. The input conductors are divided into groups of four consecutive conductors and the groups are connected to the pins in the even-numbered rows in a cyclic permutation so that a specific group of four input conductors is connected to a plurality of groups of four pins in a specific even-numbered row. The output conductors are divided into two groups and the conductors of these groups are then consecutively connected to the pins in the two odd-numbered rows of pins adjacent a specific even-numbered row of pins. This layout in essence produces a symmetrical pin arrangement wherein an input pin is surrounded by eight output pins connected to different output conductors and an output pin is surrounded by eight input pins connected to different input conductors. Connections between any input conductor and any output conductor can be effected by automated apparatus using a small rigid connector which connects appropriate ones of the input and output pins without any problem of interference between such connectors. The distribution board provides basically the same function as a conventional pin crosspoint switch but has only approximately one-eighth the number of pins required by the pin crosspoint switch.

DESCRIPTION OF THE DRAWING

The invention will be more fully comprehended from the following detailed description and accompanying drawing in which.

DETAILED DESCRIPTION

Figure 1:
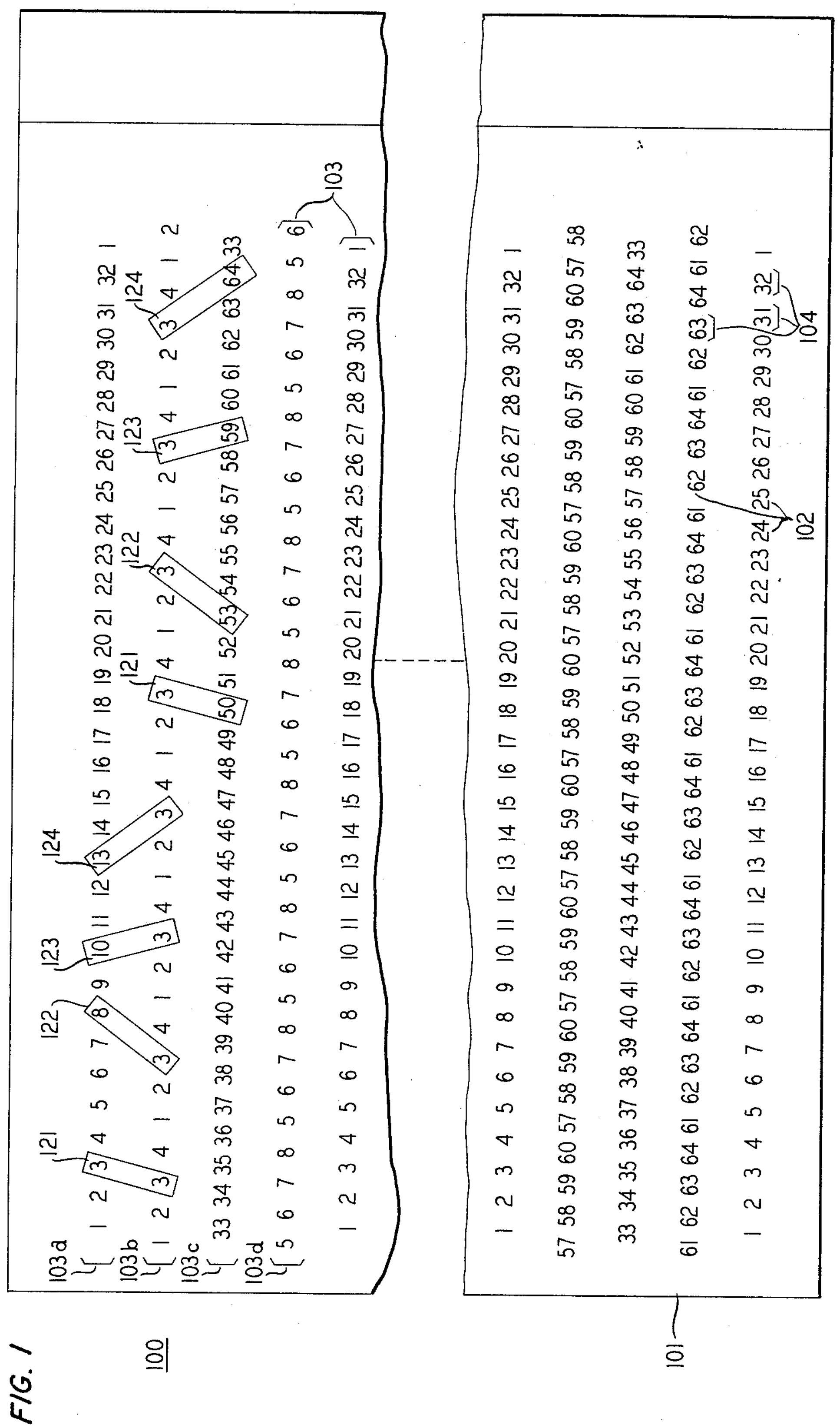
FIG. 1 is a schematic representation of the distribution board of the invention having 64 input and 64 output conductors and having the associated pins thereof designated by numbers.

In FIG. 1 is illustrated a distribution board or pin connection switch 100 comprising a printed circuit board 101 in which a plurality of pins 102, which are designated by numbers, are mounted. Printed circuit board 101 may be a glass epoxy board or other type commonly used for such applications and advantageously is a double sided board, i.e., can have a printed circuit pattern on each side thereof. The primary function of the board 101 is to provide a stiff back for the conductors thereon. Accordingly various types of stiff boards having conductors on the surfaces thereof can be utilized in the described distribution board or switch. Pins 102 are commonly used conductive pins and advantageously extend from both sides of board 101. Pins 102 are arranged in rows 103 and columns 104 with the pins in the even-numbered rows forming a first series of columns and the pins in the odd-numbered rows forming a second series of columns alternating with the first series. All pins except those along edges of the pin pattern are centered with respect to and equidistant from the four closest pins in the two adjacent rows.

The term "conductor" is used generically herein to represent either a single wire conductor or a pair of wires such as utilized in a telephone subscriber's line. Likewise, the term "pin" is used generically to represent either a single conductive pin terminal when used with a single wire conductor or two associated pin terminals when used with a conductor comprising a wire pair.

The preceding description of the arrangement of the pins of FIG. 1 in columns strictly applies only when a pin comprises a single pin terminal. Where the pins each comprise two associated pin terminals, the description of the column arrangement applies only with respect to the centers of the pins, i.e., the centroids of the pin terminal pairs comprising the pins, and the actual pin terminals in both the even-numbered and odd-numbered rows may be in the same columns. The distance between the pair of pin terminals comprising a single pin is not necessarily the same as the distance between those pin terminals and the pin terminals of neighboring pins as is illustrated in FIGS. 2A and 2B.

The distribution board of this invention is designated for selectively interconnecting conductors from a first group with conductors from a second group as is now accomplished, for example, by a cross-connection or jumper in a main distributing frame of a telephone central office or by a pin shorting an "*x*" conductor to a "*y*" conductor in a crosspoint switch.

Figure 2A:
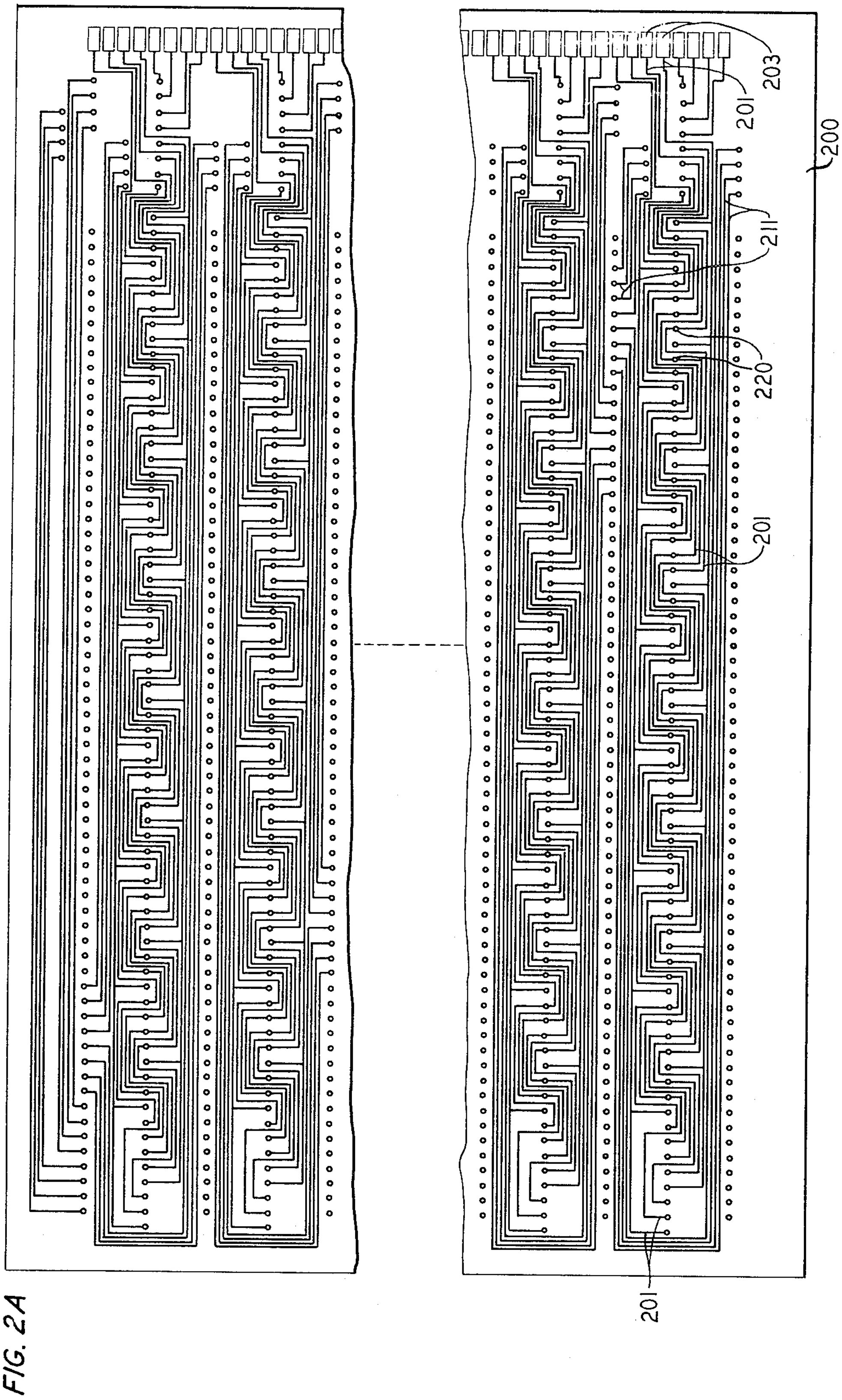
FIGS. 2A and 2B are representations of the two sides of a distribution board respectively showing conductor patterns which can be used with the pin layout of FIG. 1.
Figure 2B:
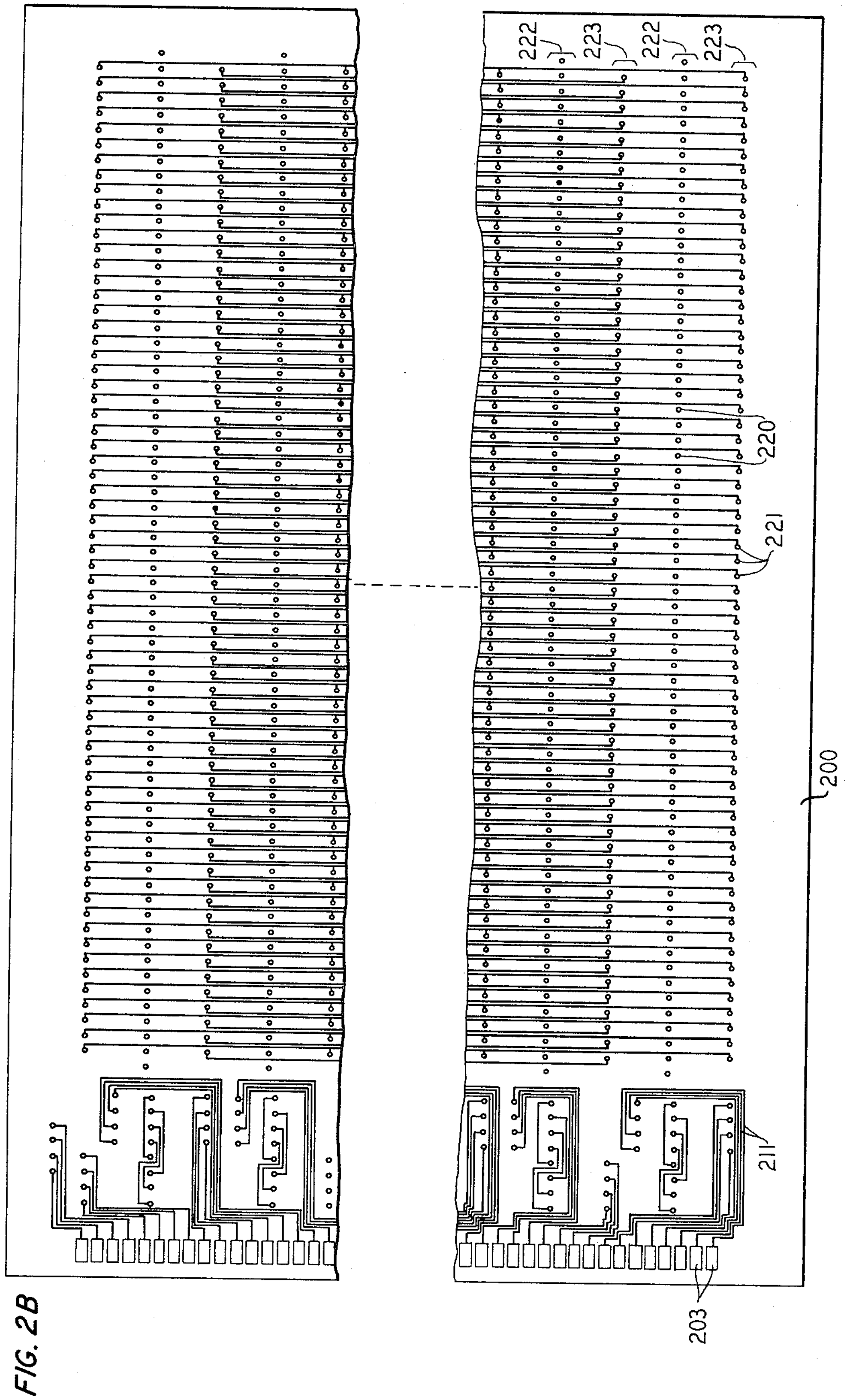

As is illustrated in FIGS. 2A and 2B, representing respective sides of a printed circuit board 200, a first group of conductors designated as input conductors 201 can be routed to printed circuit board 200 through terminals 203. A second group of conductors designated as output conductors 211 are also routed to the board 200 through other terminals 203. The input and output conductors 201 and 211, respectively, can be routed to either side of board 200 and can be taken to desired locations by appropriate paths and feedthroughs. Each of the input and output conductors 201 and 211, respectively, comprises a pair of wires and each of the pins 220 and 221 comprises a pair of pin terminals in this embodiment.

It is apparent that all connections to board 200 are made along only one edge thereof as compared with the minimum of two edges normally required by crosspoint switches. Accordingly, the number of mating connectors required is reduced and the ease of connection of board 200 with the mating connector is increased.

Input and output conductors 201 and 211, respectively, are connected to respective input and output pins 220 and 221 in alternating rows 222 and 223, respectively, and can then be interconnected by selectively interconnecting the appropriate pins 220 and 221 by a small rigid connector. Input conductors 201 are divided into groups of four consecutive conductors each and each group is connected in a cyclic permutation to the pins 220 within one of the rows 222 designated as input pins. The output conductors 211 are divided into two groups and the conductors of these groups are then connected consecutively to the pins 221 within the rows 223 designated as output pins.

The foregoing will be more apparent with reference again to FIG. 1 in which the odd-numbered rows **103*a* and 103*c* of pins 102 are designated as output pins and the even-numbered rows 103*b* and 103*d* of pins 102 are designated as input pins. The pins within the specified rows are designated by numbers corresponding to the specific conductor to which the pin is connected. In the illustrative embodiment 64 unique input conductors and 64 unique output conductors are routed to board 101. The 64 input conductors are divided into sixteen groups of four consecutive conductors each with the first group comprising conductors 1, 2, 3 and 4; the second group comprising conductors 5, 6, 7, 8, etc. The first group of input conductors comprising conductors 1, 2, 3 and 4 are connected to the pins in the first even-numbered row of pins, i.e., row 103*b* on board 101, in a cyclic permutation. Input conductor 1 is connected to the first pin in row 103*b* and to all input pins in row 103*b* designated by the numeral 1; input conductor 2 is connected to the second pin in row 103*b* and all input pins in row 103*b* designated by numeral 2, etc., unitl all pins in row 103*b* have been utilized. In the illustrative embodiment each input conductor is connected to at least eight different input pins within the specified row. In like manner, the second group of input conductors comprising conductors 5, 6, 7 and 8 are connected to input pins in the second even-numbered row, i.e., row 103*d* on board 101. This process is continued until all groups of input conductors have been connected to input pins in specified even-numbered rows on printed circuit board 101.**

As previously mentioned the output conductors are divided into two groups and the conductors of each group are connected in consecutive order to the pins in one of the odd-numbered rows on board 101 adjacent each of the even-numbered rows. In the illustrative embodiment the sixty-four unique output conductors are divided into two groups comprising output conductors 1 to 32 and output conductors 33 to 64, respectively. The first group comprising output conductors 1 to 32 is connected in consecutive order to the pins in the first odd-numbered row, i.e., row **103*a* of output pins, until all pins in this row are utilized. The second group comprising output conductors 33 to 64 is connected in consecutive order to the pins in the second odd-numbered row, i.e., row 103*c*** of output pins. This connection sequence is repeated with respect to subsequent odd-numbered rows of pins.

Each row of input pins, e.g., rows **103*b* and 103*d*, contains more pins than the adjacent rows 103*a* and 103*c*** of output pins. However in all rows the connection sequence being utilized in the particular row is followed until all pins are utilized. Thus, the "extra" pins at the ends of the rows are utilized to shorten possible cross-connection paths and to insure that each output pin is within a spacing no greater than one row and three columns from an input pin connected to every respective input conductor and conversely. Each input and output pin is in parallel with every other input and output pin, respectively, which is connected to the same respective input or output conductor.

In general if the pins in a specified even-numbered row, i.e., an input pin row, are restricted to only one group of four input conductors as shown herein, the total number of rows of input pins required will be one-fourth the total number of input conductors. It should be apparent that a sufficiently long row of input pins could be utilized for more than one group of input conductors if the number of output pins in the adjacent rows is likewise extended and these output pins are connected to the respective groups of output conductors in a repetitive sequence. In the illustrative embodiment the number of rows of output pins is one more than the number of rows of input pins with the first group of output conductors being connected to this additional one row. The number of pins in each row must equal at least one-half the total number of output conductors in order for all output conductors to be connected to at least one pin in one of the two rows adjacent each row of input pins.

Utilizing the foregoing pin arrangement, it is apparent that except for the pins along the edges of the pin arrangement each input pin is surrounded by and centered with respect to eight output pins connected to different output conductors and conversely each output pin is surrounded by and centered with respect to eight input pins associated with eight unique input conductors. Accordingly, any desired connection between any input conductor and any output conductor can be effected by utilizing a short rigid connector to join the pins associated with the specific input and output conductors. The pins along the edges of the pin arrangement, i.e., the first and last row and the first three and last three columns, are surrounded by and centered with respect to smaller numbers of opposite pins.

FIG. 1 also illustrates four connector configurations by which any possible interconnections between input and output conductors can be made. The interconnections of input pin 3 with output pins 3 and 50 illustrate a short positive slope connector 121. The interconnections of input pin 3 with output pins 8 and 53 illustrate a long positive slope connector 122. The interconnections of input pin 3 with output pins 10 and 59 illustrate a short negative slope connector 123. Finally, the interconnections of input pin 3 with output pins 13 and 64 illustrates a long negative slope connector 124. It should be apparent from analysis of FIG. 1 that input pin 3 can be interconnected with any one of the 64 output pins associated with the 64 unique output conductors by one of the four disclosed connectors. In general, any input pin can be interconnected with any specific output pin by using one of these connectors thereby selectively interconnecting any input conductor with any output conductor. The maximum distance or spacing between a specified input pin and any desired output pin is no greater than one row and three columns within the pin pattern.

Figure 3A:
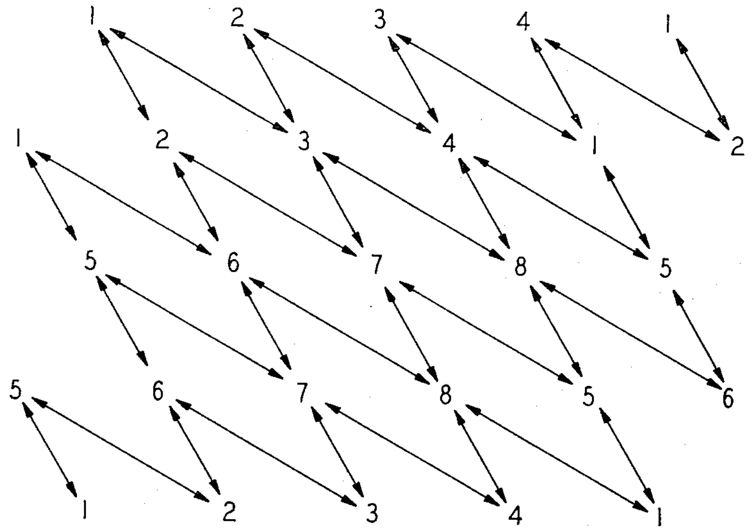
FIGS. 3A and 3B are schematic representations of a method of interconnecting the pins on the distribution board of FIG. 1 without producing any blocking or interference.
Figure 3B:
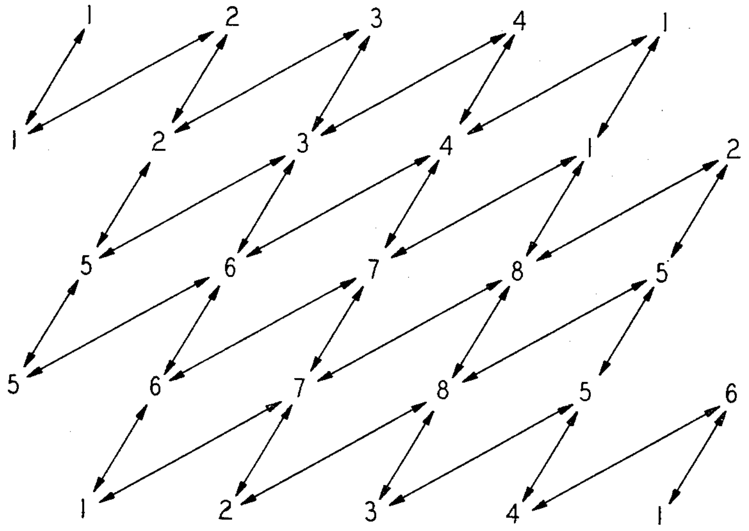

The required number of unique connectors required to make the interconnections illustrated in FIG. 1 can be reduced from four to two by utilizing both sides of the printed circuit board for making interconnections. FIG. 3A illustrates one side of a printed circuit board in which all connections requiring negative slope connectors are established. FIG. 3B shows an "x-ray" view, i.e., a view as it would appear through a transparent board, of the opposite side of the board on which all connections requiring positive slope connectors are established. It should be apparent that if the board is rotated 180°, the connectors shown in FIG. 3B will appear as negative slope connectors similar to those of FIG. 3A in a direct view. Accordingly, only short and long negative slope connectors, such as connectors 123 and 124 in FIG. 1, would be required to obtain any desired interconnection. A similar analysis would demonstrate that only positive slope connectors could be utilized by reversing the connector slope on each surface of the board. An additional advantage accruing from the utilization of both sides of the board for making interconnections is that the possibility of blockage or interference between positive and negative slope connectors is eliminated because there is no crossing of positive and negative slope connectors.

Figure 4:
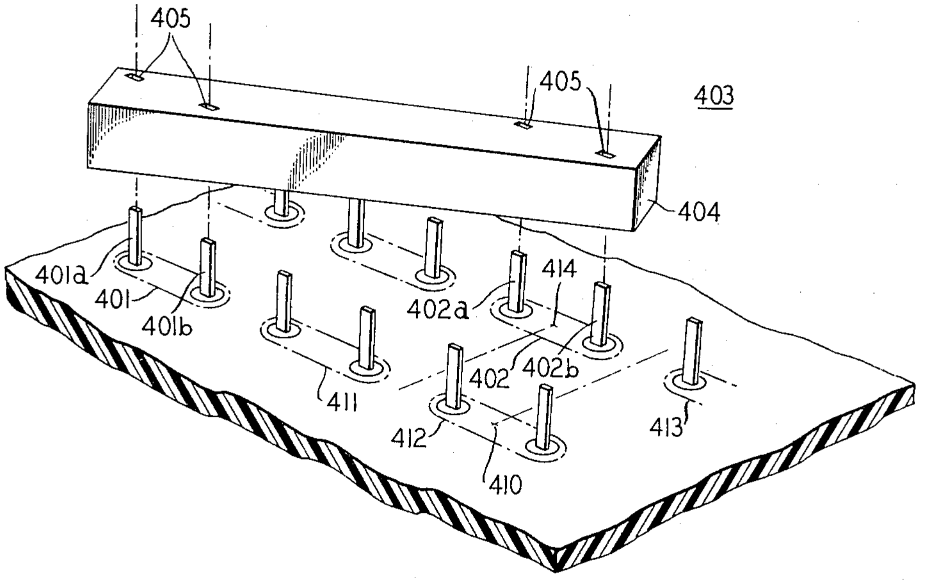
FIG. 4 is a detailed representation of the interconnection by a rigid connector of an input pin and an output pin each of which comprises a pair of terminals.

FIG. 4 shows a connector of the type that advantageously can be utilized as connectors 121 to 124 in FIG. 1. In the illustration input pin 401 comprising a pair of pin terminals 401*a* and 401*b* is to be interconnected by connector 403 with output pin 402 comprising pin terminals 402*a* and 402*b*. This interconnection of pins 401 and 402 can thereby interconnect two conductors each of which comprises a pair of wires. Connector 403 comprises an insulating body 404 having therein a plurality of contacts 405 in a pattern corresponding to the pattern of pins 401 and 402 and internal conductors connecting appropriate contacts. Connector 403 fits over pins 401 and 402 and electrically interconnects them. The dimensions of connector 403 will of course depend upon the spacings of the pins being interconnected thereby. A relatively short connector can be utilized to connect any input pin with the four closest output pins, i.e., the two closest output pins in each of the two adjacent rows, whereas a relatively long connector such as illustrated in FIG. 4 is needed to establish connections with the four output pins which are further removed. FIG. 4 further illustrates how the center 410 of an input pin 412 is symmetrical to or centered between the two output pins 402 and 413 in the adjacent row and conversely the center 414 of output pin 402 is centered between input pins 411 and 412.

The disclosed distribution board offers the advantages of a matrix or pin crosspoint or matrix switch without simultaneously having the disadvantages of such a switch. A major disadvantage of a crosspoint switch is its initial cost. This can be attributed in part to the high percentage of unused apparatus in such a switch. For example, in a crossoint swtich for interconnecting 64 input conductors with 64 output conductors a maximum of 64 crosspoints out of the total number of 4,096 crosspoints are utilized at any one time. This is a utilization factor of only 0.0156. The unused crosspoints are represented by terminal pins, etc., which add substantially to the cost of the total switch unit. The distribution board of this invention reduces the number of terminal pins, etc., by approximately a factor of eight as compared with a crosspoint switch since each input pin is surrounded and shared by eight output pins and conversely. Accordingly, this distribution board is substantially more attractive economically than the presently known pin cross-point switch.

The reduction in the number of pins discussed previously cannot be achieved merely by increasing the number of output pins shared by an input pin. Additionally, there must be a simultaneous increase in the number of input pins shared by each output pin. This requires the substantially symmetrical pin arrangement disclosed herein in which each input pin away from the edges of the pin pattern is shared by eight output pins and conversely.

If the number of output pins shared by an input pin (or conversely) is increased beyond eight, the problems of overlapping and interfering cross-connections arises as in terminal switches and greatly increases the problems of automating such switches. Accordingly, the sharing of each pin by eight pins of the opposite type appears optimum. This requires the pin arrangement disclosed in the foregoing description. Distribution boards or switches in which an input pin is shared by less than eight output pins and conversely are not as efficient as the previously described switch. Nevertheless, such switches still require less pins than a comparable crosspoint switch.

Establishing and terminating connections on the disclosed distribution board can be automated in a manner similar to a crosspoint switch.

Figure 5:
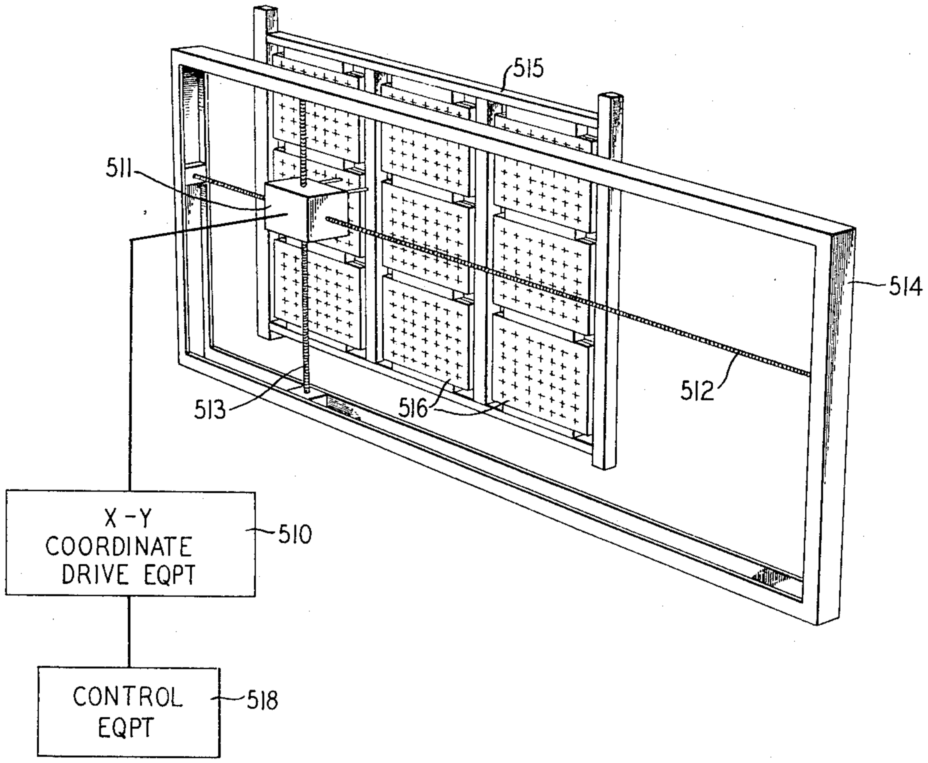
FIG. 5 illustrates an automated system for effecting interconnection changes in a main distributing frame utilizing distribution boards of this invention.

FIG. 5 illustrates an automated system for establishing and terminating cross-connections on the distribution board. A distribution frame 515 has a plurality of distribution boards 516 in accordance with this invention by which subscriber lines (not shown) are interconnected with switching equipment (not shown). Automated equipment 511, which can comprise apparatus known in the art, is mounted in a frame 514 for movement with respect to distributing frame 515 for installing and removing the previously described connnectors on the pins of boards 516. Equipment 511 can move within frame 514 along perpendicular guides or tracks 512 and 513. The major requirements for equipment 511 are that it be able to grasp and insert or remove a connector of the type described and thal it be able to be positioned very accurately with respect to frame 515 and distribution boards 516. Equipment 511 is directed to a particular location by drive equipment 510 which acts in response to control equipment 518. Control equipment 518 can include a keyboard or other input devices for entering information such as coordinate locations of the specific connections to be established or terminated. Drive equipment 510 and control equipment 518 can comprise apparatus well known in the automated equipment art, examples of which are disclosed in E. M. Graffe, S. Romo and D. E. Woolridge, *Handbook of Automation Computation and Control*, pages 20–63 to 20–66 (Vol. 2, 1959). It should be apparent that a plurality of frames 515 each containing numerous boards 516 can be connected together and the connectors thereon can be installed or removed by one or more equipments 511.

The foregoing discussion has been directed to a distribution board or switch which can be used in an automated main distributing frame but the principles of the invention have a much broader application. In general, the principles are applicable anywhere a switch having the characteristics of a pin matrix or crosspoint switch is desired. Connections on the subject switch can be established or terminated manually as well as automatically. Further, the distribution board or switch can be utilized in multistage applications where an output from one board or switch in one stage comprises an input to a board in the subsequent stage.

The connector for connecting the appropriate pins has been described in its preferred embodiment as a small rigid structure having contacts therein into which the pins on the board are inserted. The rigid connector could be replaced by short wire straps which could be inserted and removed by automated wiring apparatus. In still another embodiment the pins on the board could be replaced by receptacles or female contacts while the female contacts on the rigid connector are replaced by pins which are insertable in the appropriate receptacle on the board.

Various other modifications to the described embodiments may be made by those skilled in the art without departing from the spirit and scope of the invention.

What is claimed is:

1. Apparatus for selectively interconnecting a plurality of first conductors with a plurality of second conductors comprising, in combination:

a mounting board having thereon a plurality of substantially parallel rows of conductive pins including a first plurality of rows of first pins, a seocnd plurality of rows of second pins and a third plurality of rows of second pins, each of said first plurality of rows having one of said second plurality of rows on one side thereof and one of said third plurality of rows on the other side thereof, said conductive pins in said plurality of rows having substantially equal spacings therebetween within each of said rows arranging said pins in columns;

said first conductors being divided into groups of four conductors, each of said groups having said conductors therein connected to respective ones of said first pins in one of said first plurality of rows in a repetitive sequence so that each of said first conductors in said group is connected to a plurality of said first pins within said one row;

said second conductors being divided into first and second groups, said first group having said conductors therein connected to respective ones of said second pins in each of said second plurality of rows, said second group having said conductors therein connected to respective ones of said second pins in each of said third plurality of rows; and means for interconnecting two of said pins located within a spacing no greater than one of said rows and three of said columns of each other for thereby selectively interconnecting said first and second conductors.

2. Apparatus in accordance with claim 1 wherein said plurality of first conductors and said plurality of second conductors each comprises 64 conductors;

said first, second and third pluralities of rows respectively comprise sixteen, nine, and eight rows of conductive pins; and each of said plurality of rows includes at least 32 of said pins whereby each of said first and said second conductors is connected to at least eight different ones of said pins on said board.

3. Apparatus in accordance with claim 2 wherein each of said 16 rows includes 34 pins, each of said 16 rows having the first two and the last two pins therein respectively connected to the same ones of said first conductors; and each of said nine rows and said eight rows includes 33 pins, each of said nine rows and said eight rows having the first and last pins therein connected to the same one of said second conductors, whereby each one of said first conductors has one of said first pins connected thereto within a spacing of one of said rows and three of said columns of one of said second pins which is connected to each one of said second conductors.

4. Apparatus in accordance with claim 1 wherein said plurality of first conductors comprises M conductors and said plurality of second conductors comprises N conductors where M and N are multiples of four:

said first plurality of rows comprises M/4 rows;

said second plurality of rows comprises M/8 + 1 rows;

said third plurality of rows comprises M/8 rows; and each of said plurality of rows includes at least N/2 pins therein.

5. Apparatus in accordance with claim 1 wherein said pins in said first plurality of rows form a first series of said columns, said pins in said second and said third pluralities of rows form a second series of said columns alternating with said first series, each of said columns of said second series being centered between two of said columns of said first series, each of said first pins in the Kth one of said columns is centered with respect to the eight closest ones of said second pins each of which is connected to a respective one of said second conductors, and each of said second pins in said Mth column and the Nth one of said plurality of rows is centered with respect to the eight closest ones of said first pins each of which is connected to a respective one of said first conductors, where K and M are integers representing the relative positions of said columns and have values of $4 \leq K \leq P-4$ and $4 \leq M \leq P-4$ where P is the total number of said columns, and N is an integer representing the relative position of said row and has a value $2 \leq N \leq Q-2$ where Q is the total number of said plurality of rows.

6. Apparatus in accordance with claim 1 wherein each of said pins comprises a pair of pin terminals and each of said first and second conductors comprises a pair of conductive members.

7. Apparatus for selectively interconnecting a plurality of first conductors with a plurality of second conductors comprising a mounting board having thereon at least one row of first conductive pins connected to said first conductors, first and second rows of second conductive pins on respective first and second sides of said one row of first pins and connected to said second conductors, and means for connecting said first pins with said second pins to selectively interconnect said first and second conductors characterized in that:

said first conductors are divided into groups of four conductors;

said first pins in said one row are divided into groups of four first pins;

said conductors in each of said groups of first conductors are connected to respective pins in a plurality of said groups of said first pins in a repetitive sequence so that each of said first conductors is connected to a plurality of said first pins;

said second conductors are divided into first and second groups, said conductors in said first and second groups are connected to respective pins in said first and second rows of second pins, respectively; and said pins have substantially equally spacings therebetween within said rows so that said pins are arranged in columns whereby each one of said first conductors has at least one of said first pins connected thereto located within a spacing of three of said columns and one of said rows of said second pins which are connected to every respective one of said second conductors.

8. Apparatus for selectively interconnecting a plurality of first conductors with a plurality of second conductors comprising, in combination:

a mounting board having thereon a plurality of rows of first contact members;

said first conductors being divided into first groups, each of said first groups having said conductors therein connected to a plurality of said first contact members in one of said rows in a repetitive sequence;

said second conductors being divided into second groups, said second groups having said second conductors therein connected to respective ones of said first contact members in said rows adjacent said one row; and connector means including second contact members adapted to mate with said first contact members for interconnecting said first contact members in said one row with said first contact members in said adjacent rows for thereby selectively interconnecting said first and second conductors.

9. Apparatus in accordance with claim 8 wherein said plurality of first conductors comprises M conductors and said plurality of second conductors comprises N conductors;

said first groups comprise M/4 groups having said conductors therein connected to respective ones of said first contact members in a respective one of said M/4 of said rows in a repetitive sequence;

said second groups comprise two groups having said conductors therein connected to respective ones of said first contact members in a respective one of said rows adjacent said respective one of said M/4 rows, where M is a multiple of 4 and N is a multiple of 2.

10. Apparatus in accordance with claim 8 wherein said first and second contact members comprise a pair of pin terminals and a pair of pin receptacles, respectively, and said first and second conductors comprise pairs of conductive members.

11. A pin connector switch for interconnecting any one of a plurality of input conductors with any one of a plurality of output conductors comprising a printed circuit board having said input and output conductors thereon, and a plurality of alternating rows of input and output contact means on said board connected to said input and output conductors, respectively, so that said input and output conductors can be interconnected by interconnecting said input and output contact means, characterized in that:

said input conductors are divided into groups of four input conductors, said four input conductors of respective groups being connected to respective ones of said input contact means within one of said rows in a repetitive sequence; and said output conductors are divided into two substantially equal groups, said output conductors in respective ones of said two groups being connected to respective output contact means in respective ones of said rows on respective sides of said rows of said input contact means, whereby the four of said input contact means within one of said rows closest to a respective output contact means in an adjacent one of said rows are connected to different ones of said input conductors and conversely.

12. Apparatus in accordance with claim 11 wherein said input and output conductors each comprises a pair of conductive elements and said input and output contact means each comprises a pair of pin terminals which connect to respective ones of said conductive elements.

13. Apparatus in accordance with claim 11 wherein said input and output contact means have substantially equal spacings therebetween within respective rows so that said input and output contact means are arranged in columns; and said sequence is repeated a sufficient number of times so that each of said input conductors has at least one of said input contact means connected thereto located within a spacing of three of said columns and one of said rows of said output contact means which are connected to every respective one of said output conductors.

* * * * *